(12) United States Patent
Hatzav et al.

(10) Patent No.: US 8,724,183 B2
(45) Date of Patent: May 13, 2014

(54) APPARATUS AND METHOD FOR READING ID DOCUMENTS IN AN OPEN ENVIRONMENT

(76) Inventors: Iuval Hatzav, Culver City, CA (US); Ilan Ben-Shahar, Savion (IL); Giyora Sharaby, Moshav Neve Yarak (IL); Daniel Hatzav, Hod Hasharon (IL)

( * ) Notice: Subject to any disclaimer, the term of this patent is extended or adjusted under 35 U.S.C. 154(b) by 46 days.

(21) Appl. No.: 13/571,385

(22) Filed: Aug. 10, 2012

(65) Prior Publication Data
US 2014/0043661 A1    Feb. 13, 2014

(51) Int. Cl.
*H04N 1/04*    (2006.01)

(52) U.S. Cl.
USPC ............ 358/474; 358/497; 358/498; 358/473

(58) Field of Classification Search
USPC ...................... 358/474, 498, 497, 473, 505
See application file for complete search history.

(56) References Cited

U.S. PATENT DOCUMENTS

| 6,611,362 B2 * | 8/2003 | Mandel et al. ................ 358/474 |
| 2009/0180085 A1 * | 7/2009 | Rieck et al. ..................... 355/25 |

* cited by examiner

*Primary Examiner* — Houshang Safaipour

(57) ABSTRACT

An imaging apparatus for imaging a document in an open environment or a closed environment including processor, memory, an imaging device having at least one image sensor and a direct light-source, a bench having an upper surface and a document holding mechanism having at least one paperweight. The paperweights are disposed in respective fitted hollow columns formed in the document holding mechanism, extending generally perpendicular, upwardly from the upper surface of the bench, wherein the respective fitted hollow column facilitates free up and down motion of the paperweight inside, and wherein the document may be pushed underneath said paperweight to thereby flatten the document.

10 Claims, 7 Drawing Sheets

Cross section AA'

APPARATUS AND METHOD FOR READING ID DOCUMENTS IN AN OPEN ENVIRONMENT

FIELD OF THE INVENTION

The present invention relates to apparatuses for reading ID documents in an open environment and more particularly, the present invention relates to an apparatus and method for acquiring digital image frames of ID documents in an open environment. The ID documents may include, with no limitation, ID cards, business cards, checks and receipts, as well as booklet-type documents such as passports, so as to extract data automatically from the imaged document with machine vision tools. The apparatus includes an imaging apparatus having a direct illumination sub system, a bench with a flat surface for placing the document thereon, and a document holding mechanism, wherein the bench is disposed in the open environment, regardless of the ambient light conditions.

BACKGROUND OF THE INVENTION

There exist in today's market imaging devices capable of reading documents such as ID cards, drivers license, business cards, passports, medical cards and the like, and including booklet-type documents such as passports (hereinafter referred to, with no limitations, as "passport"). In imaging devices that include an imaging sensor array, based on technologies such as a CCD or CMOS, it is desired that the imaged document will be uniformly placed within the focal depth of the imaging sensor, in order to obtain a substantially true image of the imaged document.

The uniformity of the document illumination may affect the quality of an image, for example, by external ambient light sources. Such random illumination may, for example, cause hot spots in the formed image and/or shadows distortions. The type of light might also be a factor, for example, sun, electric bulb, florescent lighting, etc. Hence, most imaging devices do not operate in such "open environment", containing random illumination sources.

Therefore, prior art imaging devices include substantially enclosed chambers ("closed environment") that are designed to block ambient light (typically coming from random light sources) from illuminating the imaged document that typically, form spot lights in the image frame of the imaged document. By way of example, this problem is described in U.S. Pat. No. 7,948,665 given to Hatzav et al, in U.S. Pat. No. 8,136,966 given to Hatzav et al, in U.S. patent application Ser. No. 13/185,510 by Hatzav et al., in U.S. patent application Ser. No. 13/223,342 by Hatzav et al and in U.S. patent application Ser. No. 13/284,361 by Hatzav et al.

The document is typically placed on a substantially flat surface, wherein that flat surface faces the image sensor. For example, with no limitations, the imaging device includes at list one image sensor that faces down towards the flat surface. In this case, a passport is placed on top of the flat surface such that the desired page faces up towards the image sensor.

However, when placing an open passport with internal pages facing up, the pages tent to rise and the page to be imaged has to be forced to lie flat, facing up.

There is therefore a need and it would be advantageous to have a holding mechanism for imaging apparatus that keeps the imaged document, including a page in a booklet, flat and facing up towards the image sensor of the imaging apparatus.

SUMMARY OF THE INVENTION

In view of the limitations now presented in the prior art, the present invention provides a new, simple and useful imaging apparatus for imaging documents that facilitates acquiring digital image frames of ID documents in an open environment. The ID documents may include, with no limitation, ID cards, business cards, checks and receipts, as well as booklet-type documents such as passports.

The term "cluster of light sources", as used herein, refers to a single light source, composed of one or more light emitting devices, such as, with no limitation a LED light source, are activated or deactivated as a single unit. When activated, the cluster of light sources directly illuminates at least a portion of the imaged document, at a preconfigured illuminating angle.

The term "alternately operating" in relation to the operation of all clusters of light sources, as used herein, refers to the activation of all of the clusters of light sources, one at a time, in a preconfigured sequence.

According to the teachings of the present invention, there is provided a imaging apparatus for imaging a document, such as an identity document, having an imaged side and a back side. The document may be a booklet type document, such as a passport. The apparatus is facilitated to operate in an open environment or a closed environment. The apparatus includes a processor and memory coupled to operate with the processor, an imaging device, a bench having an upper surface, and a document holding mechanism having at least one paperweight. Preferably, at least the lower portion of the at least one paperweight is rounded.

The imaging device includes at least one image sensor and a light-source-configuration facilitated to directly illuminate the document from at least two illuminating angles. The light source configuration includes at least one cluster of light sources, wherein the clusters of light sources are operated in a preconfigured sequence.

The imaging device is preconfigured to acquire an image frame of at least a portion of the document being imaged and to store the acquired image frame in the memory, wherein the image acquisition is operatively coupled with the activation of each of the light sources of the light-source-configuration at each of the at least two illuminating angles.

A space is formed between the bench and the image sensor, facilitating placing the document on top of the upper surface of the bench, wherein the image side of the document faces the image sensor, The at least one paperweight is disposed in a respective fitted hollow column formed in the document holding mechanism, extending generally perpendicular upwardly from the upper surface of the bench, wherein the respective fitted hollow column facilitates free up and down motion of the paperweight inside the respective fitted hollow column, and wherein the document may be pushed underneath the paperweight, typically by the operator of the apparatus, to thereby flatten the document.

Optionally, each individual light source of the light source configuration is selected from the group of light sources type, including infra red (IR), ultra violate (UV) and visible light (VL).

Optionally, each individual light source of the light source configuration is selected from the group including LED, halogen light sources and fluorescence image.

Optionally, the processor is in communication flow with a remote processing unit. The remote processing unit may be a remote server or a mobile device.

An aspect of the present invention is to provide a method for imaging a document, including the step of providing an imaging apparatus as described hereabove, wherein the clusters of light sources operated in a preconfigured sequence to directly illuminating the portions of the document being imaged, and wherein each of the at least one image sensors are preconfigured to acquire an image frame of the portions of the document being imaged, in operative synchronization with the activation of respective clusters of light sources.

The method further includes the step of:
a) placing the document on the upper surface of the bench, wherein the image side of the document faces the image sensor;
b) determining the type of the document, the type selected from the group consisting of booklet-type document, large form and small form; and
c) pushing the document underneath the paperweight, typically but with no limitation, when the document is a booklet-type document, to thereby flatten the document.

BRIEF DESCRIPTION OF THE DRAWINGS

The present invention will become fully understood from the detailed description given herein below and the accompanying drawings, which are generally not drawn to scale and are given by way of illustration only and thus, not limitative of the present invention, and wherein.

DETAILED DESCRIPTION OF THE INVENTION

Figure 1:
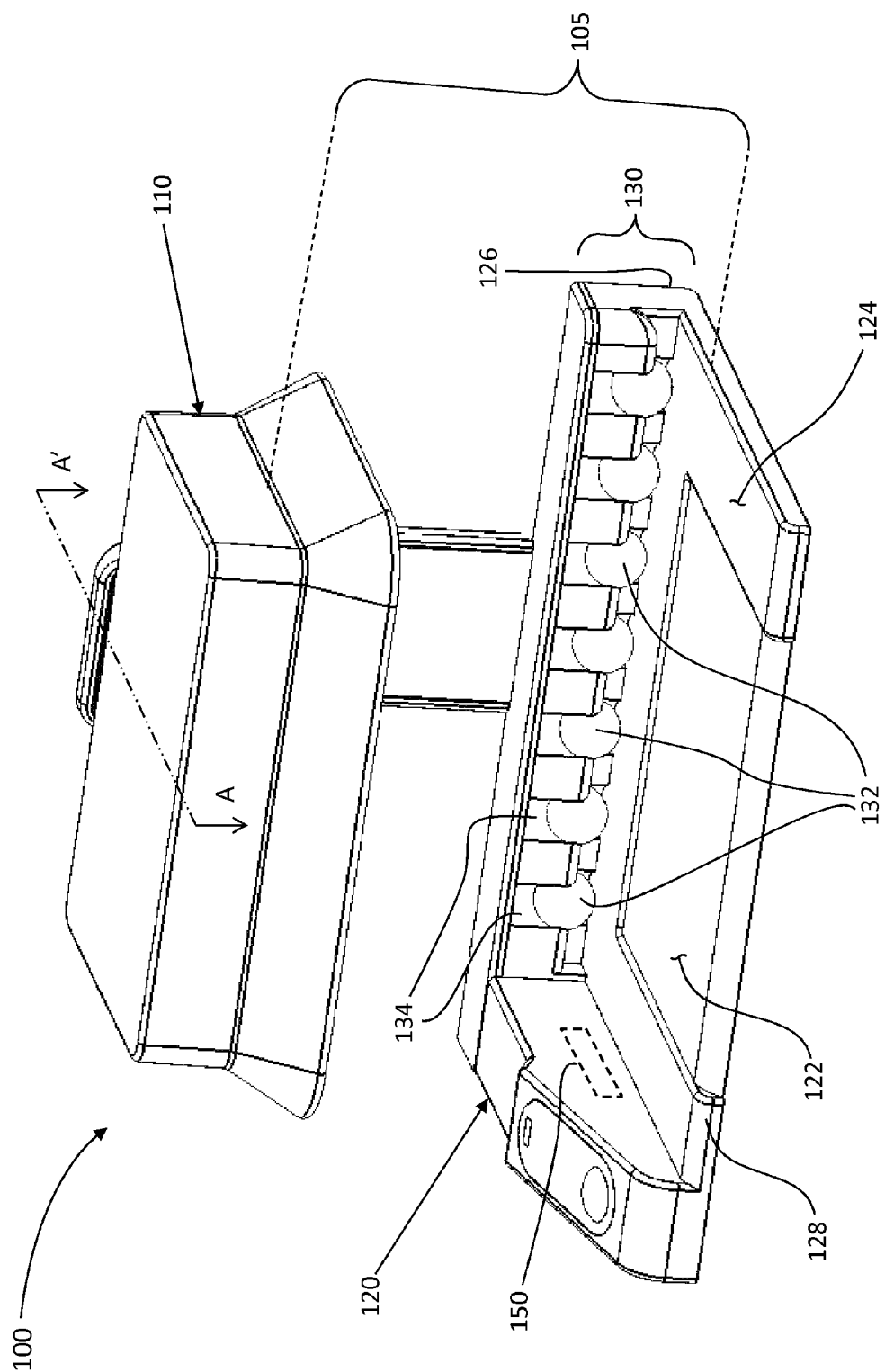
FIG. 1 is a perspective view illustration of an open-environment-imaging device having a document holding mechanism, according to embodiments of the present invention.

Before explaining embodiments of the invention in detail, it is to be understood that the invention is not limited in its application to the details of construction and the arrangement of the components set forth in the host description or illustrated in the drawings. Unless otherwise defined, all technical and scientific terms used herein have the same meaning as commonly understood by one of ordinary skill in the art of the invention belongs. Any methods and examples provided herein are illustrative only and not intended to be limiting.

Methods of the present invention may be implemented by performing or completing manually, automatically, or a combination thereof, selected steps or tasks. The term "method" refers to manners, means, techniques and procedures for accomplishing a given task including, but not limited to, those manners, means, techniques and procedures either known to, or readily developed from known manners, means, techniques and procedures by practitioners of the art to which the invention belongs. The descriptions, examples, methods and materials presented in the claims and the specification are not to be construed as limiting but rather as illustrative only.

Figure 2:
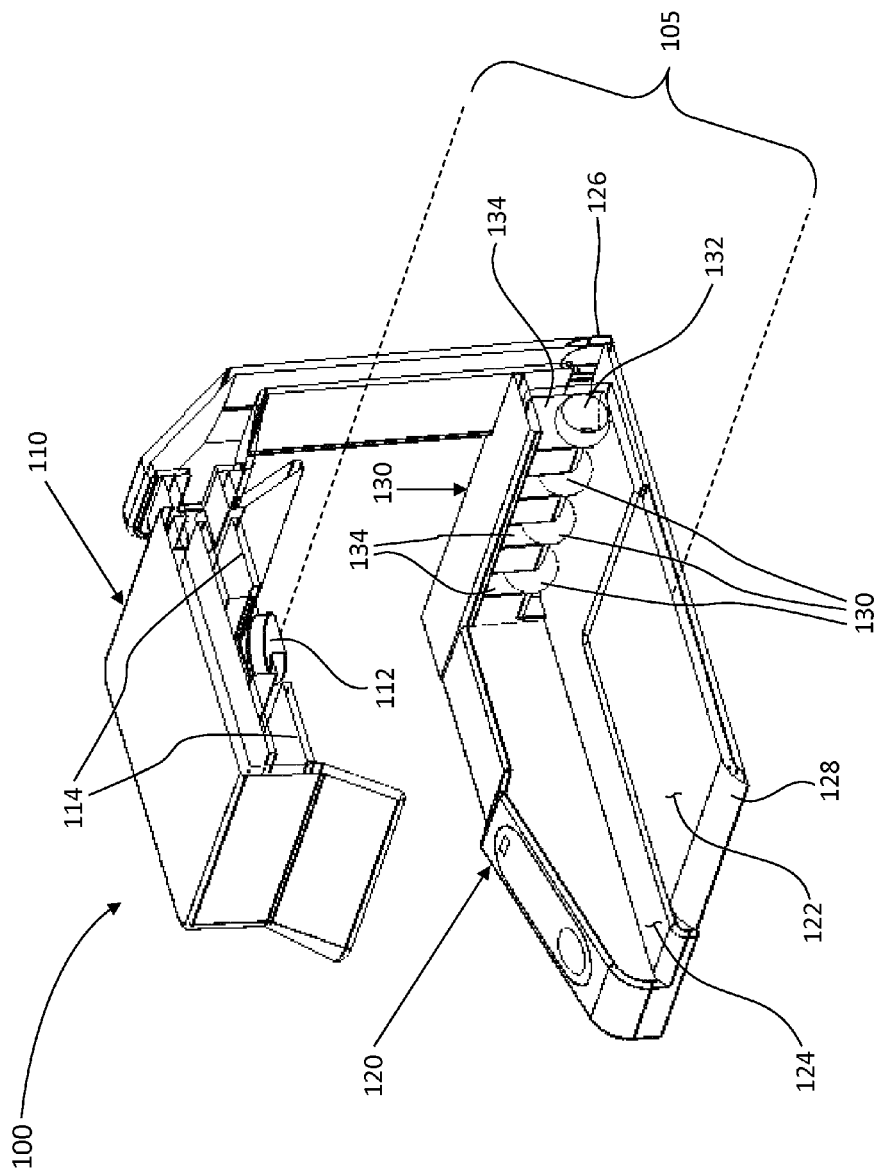
FIG. 2 is a perspective, cross-section (AA') view of the imaging apparatus shown in FIG. 1.

Reference is now made to FIG. 1, a perspective view illustration of an open-environment-imaging apparatus 100, according to embodiments of the present invention; and to FIG. 2, a perspective, cross-section (AA') view of the open-environment-imaging apparatus 100. Open-environment-imaging apparatus 100 includes an imaging device 110, a bench 120 and a document holding mechanism 130, wherein an aperture 105 is formed between bench 120 and imaging device 110, and wherein aperture 105 is preconfigured to couple with the focal length of the imaging sensor of imaging device 110.

It should be noted that imaging device 110 includes a direct illumination sub system that is indifferent to environmental light sources. For example, the direct illumination sub system includes alternating clusters of light sources 114 as described in U.S. patent application Ser. No. 13/223,342 and in U.S. patent application Ser. No. 13/284,361, the disclosure of which are incorporated by reference for all purposes as if fully set forth herein.

It should be further noted that orientation-related descriptions such as "lower" and "upper", assumes that open-environment-imaging apparatus 100 is in operationally disposed on a generally horizontal supporting surface.

Figure 3:
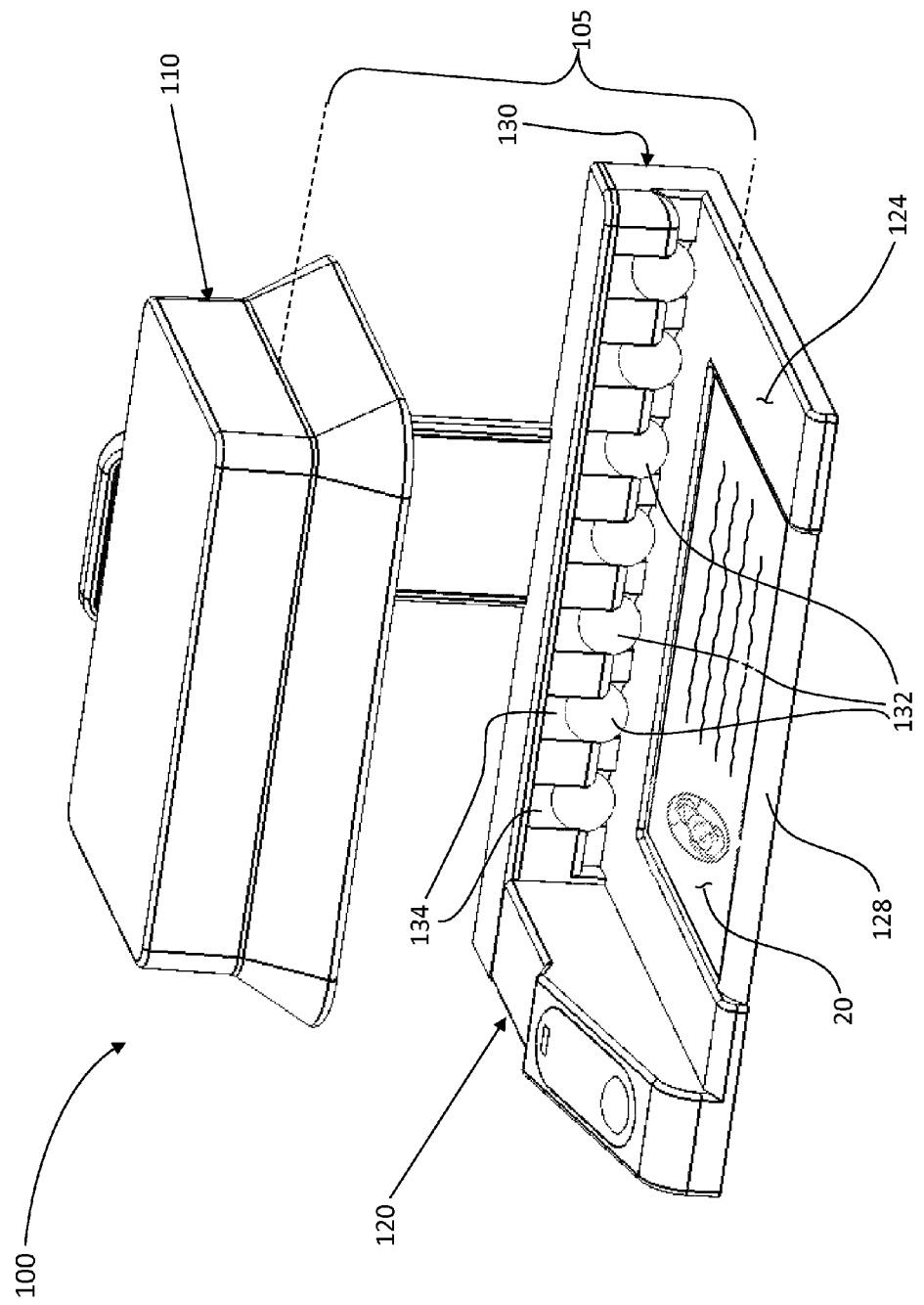
FIG. 3 is a perspective view illustration of the imaging apparatus shown in FIG. 1, hosting a small form, ID type document.

Reference is also made to FIG. 3, a perspective view illustration of open-environment-imaging apparatus 100, hosting a small form, ID type document 20. Typically, small form, ID type documents 20 are placed on surface 122 of a shallow dent formed in upper surface 124 of bench 120.

Document holding mechanism 130 is disposed on the opposing far end 126 of bench 120 with respect to the end 128 from which the operator of open-environment-imaging apparatus 100 places documents to be imaged on upper surface 124 of bench 120. Document holding mechanism 130 includes one, or preferably, more paperweights 132 disposed in respective fitted hollow columns 134 formed in document holding mechanism 130. Preferably, for ease of operation, paperweights 132 are rounded at the bottom end of the respective paperweights 132 facing end 128 of bench 120. Typically, with no limitations, paperweights 132 are spherical.

Figure 4:
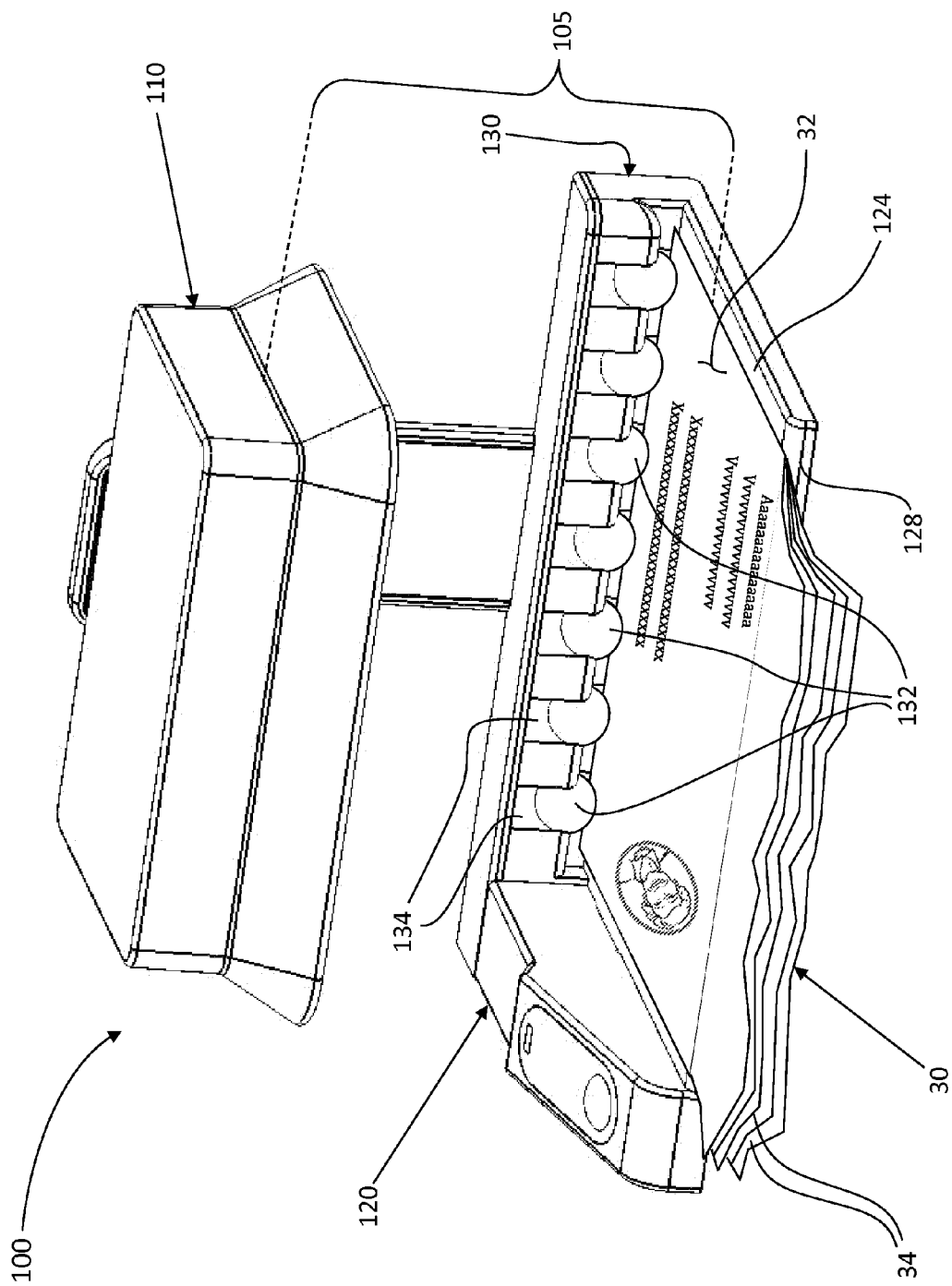
FIG. 4 is a perspective view illustration of the imaging apparatus shown in FIG. 1, hosting a booklet type document, the booklet shown partially sectioned.

Reference is also made to FIG. 4, a perspective view illustration of open-environment-imaging apparatus 100, hosting a small form, booklet type document 30. Typically, booklet type documents 30 are placed on upper surface 124 of bench 120. The side of booklet 30 that contains the page 32 to be imaged is placed on upper surface 124 of bench 120 and the other pages 34 of booklet 30 are typically held by the operator of open-environment-imaging apparatus 100.

The operator of open-environment-imaging apparatus 100 keeps page 32 to be imaged as the upper page of the portion of booklet 30, that contains the page 32 to be imaged, is placed on upper surface 124. Holding the other pages 34 of booklet 30, the operator pushes the section of booklet 30 that contains the page 32 underneath paperweights 132, which paperweights 132 press by the force of gravity on the page 32 downwards towards upper surface 124 of bench 120. Since only the margins of page 32 are pushed underneath paperweights 132, no data, contained on page 32 of booklet 30, is occluded from image sensor 112.

Figure 5:
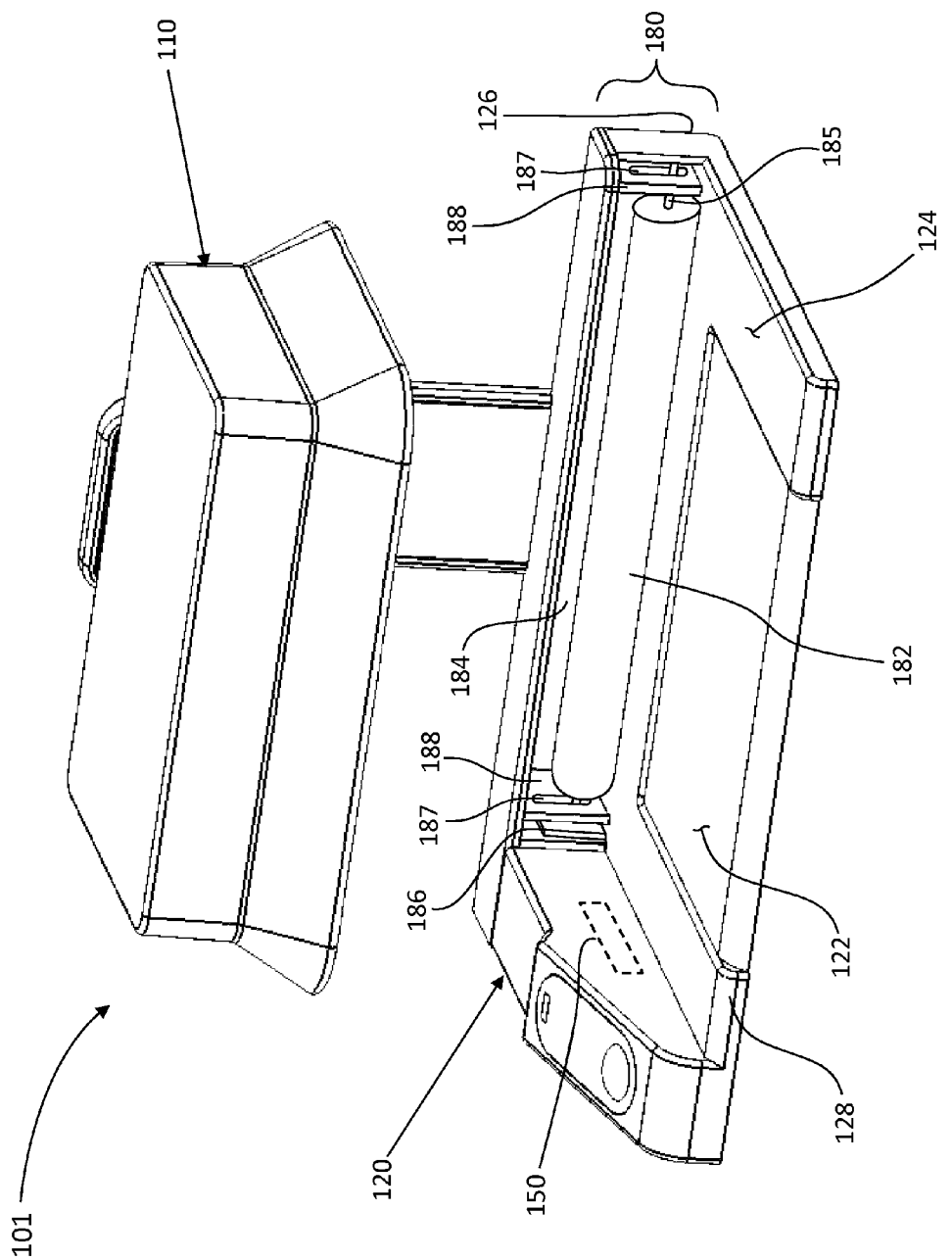
FIG. 5 is a perspective view illustration of an open-environment-imaging device having a document holding mechanism, according to variations of the present invention.

Reference is now made to FIG. 5, a perspective view illustration of an open-environment-imaging device 102, having a document holding mechanism 180, according to variations of the present invention. open-environment-imaging device 102 is similar to open-environment-imaging device 100, except for the structure of the document holding mechanism.

Document holding mechanism 180 includes a paperweight 182 disposed in respective fitted hollow columns 184 formed in document holding mechanism 180. Preferably, for ease of operation, paperweight 182 has, with no limitation, a cylindrical form, and when there is no document inserted, paperweight 182 is disposed on top of bench 120 at the far end 126 of bench 120.

Preferably, document holding mechanism 180 further includes a shaft 185 extending outwardly from the bases of the cylindrically shaped paperweight 182. A pair of walls 188 is disposed on both sides of the bases of the cylindrically shaped paperweight 182, wherein a groove 187 is formed in each wall 188, and wherein shaft 185 extends further outwardly and through grooves 187 formed in walls 188.

Preferably, shaft 185 extends further outwardly to rotatably attach to a bearing member 186, wherein bearing member 186 is disposed in a hollow space facilitates free up and down motion of bearing member 186 inside the respective hollow space, but preventing the rotation of bearing member 186 about the rotational axis of shaft 185. Thereby, facilitating rotational motion of shaft 185 about bearing members 186. Preferably, there are two bearing members 186 one on each side of paperweight 182.

Figure 6:
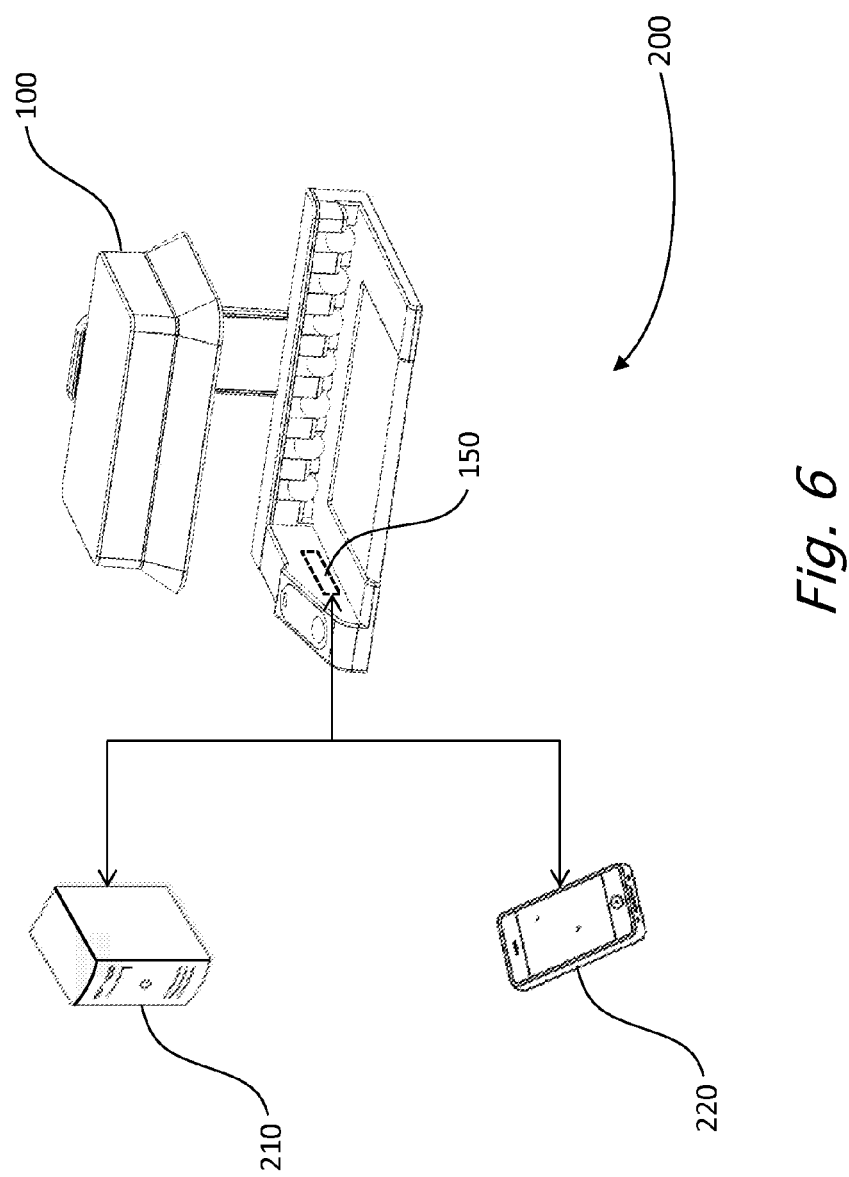
FIG. 6 is a schematic block diagram of a document imaging system, according to embodiments of the present invention.

Reference is now made to FIG. 6, a schematic block diagram of a document imaging system 200, according to embodiments of the present invention. Document imaging system 200 include an open-environment-imaging apparatus 100 (or open-environment-imaging apparatus 101) and at least one target image processing device, such as a server 210 and a smart mobile device 220.

Figure 7:
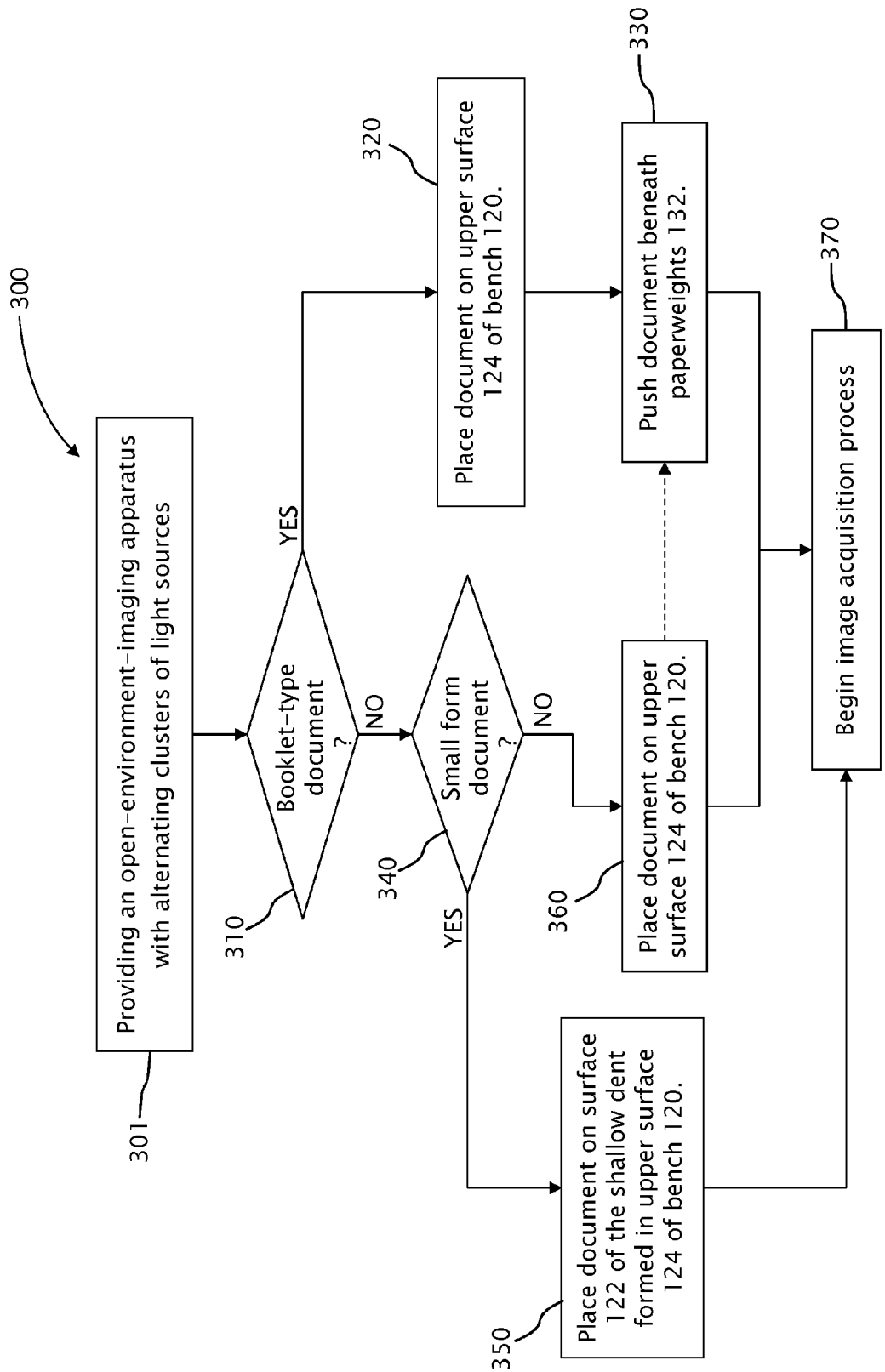
FIG. 7 is a schematic flow diagram that outlines the steps of an exemplary method for acquiring one or more image frames of a document, using the open-environment-imaging apparatus shown in FIG. 1.

FIG. 7 is a schematic flow diagram that outlines the steps of an exemplary method 300, for acquiring one or more image frames of a document, aimed, with no limitation, to extract data from the acquired one or more image frames, using open-environment-imaging apparatus 100 that is provided in step 301. Open-environment-imaging apparatus 100 includes an imaging device 110, a bench 120, a processor 150 and a document holding mechanism 130 (or document holding mechanism 180), wherein an aperture 105 is formed between bench 120 and imaging device 110, and wherein aperture 105 is preconfigured to couple with the focal length of the imaging sensor of imaging device 110, as outlined in FIGS. 1 and 2. Method 300 proceeds with the following steps:

Step 310: check if the document is a booklet-type document.
If the document is not a booklet-type document, go to step 340.
Step 320: place the document on upper surface 124 of bench 120.
Typically, with no limitations, the imaging device includes at list one image sensor that faces down towards the flat surface, wherein the booklet-type document is placed on top of upper surface 124 such that the desired page faces up towards image sensor 112.
The operator of open-environment-imaging apparatus 100 places the back of booklet-type document 30 on upper surface 124 of bench 120, such that the internal page 32, that is to be imaged, faces the image sensor, wherein the other pages 34 of booklet 30 are typically held by the operator.
Step 330: push document underneath paperweights 132 (or paperweight 182).
The operator of open-environment-imaging apparatus 100 keeps page 32 to be imaged as the upper page of the portion of booklet 30 that contains the page 32, facing image sensor 112. The operator holds the other pages 34 of booklet 30 and pushes the section of booklet 30 that contains the page 32 underneath paperweights 132 (or paperweight 182), which paperweights 132 (or paperweight 182) press by the force of gravity on page 32 downwards towards upper surface 124 of bench 120, thereby flattening page 32. Since typically only the margins of page 32 are pushed underneath paperweights 132 (or paperweight 182), no data, contained on page 32 of booklet 30, is occluded from image sensor 112.
Go to step 370.
Step 340: check if the document is a small form document.
If the document is a not a booklet-type document but is a large form document, go to step 360.
Step 350: Place document 30 on surface 122 of the shallow dent formed in upper surface 124 of bench 120.
Place the small form document 30 on surface 122 of the shallow dent formed in upper surface 124 of bench 120, such that the side to be imaged faces the image sensor.
Go to step 370.
Step 360: place the document on upper surface 124 of bench 120.
The operator of open-environment-imaging apparatus 100 places the large form document 30 on upper surface 124 of bench 120, such that the side to be imaged faces the image sensor.
Optionally, go to step 330.
Step 370: begin the image acquisition process.
The operator of open-environment-imaging apparatus 100 begins the image acquisition process, as described, for example, in U.S. patent application Ser. No. 13/223,342.

Although the present invention has been described with reference to the preferred embodiment and examples thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the following claims.

What is claimed is:

1. An imaging apparatus for imaging a document having an imaged side and a back side, the apparatus is facilitated to operate in an open environment or a closed environment, the apparatus comprising:
(a) a processor;
(b) memory coupled to operate with said processor;
(c) an imaging device comprising:
  i. at least one image sensor; and
  ii. a light-source-configuration facilitated to directly illuminate the document from at least two illuminating angles;
(d) a bench having an upper surface; and
(e) a document holding mechanism including at least one paperweight,
wherein said light source configuration includes at least one cluster of light sources, and wherein said clusters of light sources are alternately operated in a preconfigured sequence;
wherein said imaging device is preconfigured to acquire an image frame of at least a portion of the document being imaged and to store said acquired image frame in said memory, and wherein said image acquisition is operatively coupled with the activation of each of said light sources of said light-source-configuration at each of said at least two illuminating angles;
wherein a space is formed between said bench and said image sensor, facilitating placing the document on top of said upper surface of said bench, and wherein said image side of the document faces said image sensor;
wherein said at least one paperweight is disposed in a respective fitted hollow space formed in said document holding mechanism, extending generally perpendicular upwardly from said upper surface of said bench;

wherein said respective fitted hollow space facilitates free up and down motion of said at least one paperweight inside said respective fitted hollow space; and wherein the document may be forcefully pushed underneath said at least one paperweight to thereby move said at least one paperweight upwards inside said respective fitted hollow space, and wherein said at least one paperweight then flattens the document by the force of gravity.

2. The imaging apparatus as in claim 1, wherein the document is a booklet type document, such as a passport.

3. The imaging apparatus as in claim 1, wherein at least the lower portion of said at least one paperweight is rounded.

4. The imaging apparatus as in claim 1, wherein said hollow space is a hollow column, and wherein each of said at least one paperweights is disposed a respective hollow column.

5. The imaging apparatus as in claim 1, wherein each individual light source of said light source configuration is selected from the group of light sources type, including infrared (IR), ultra violate (UV) and visible light (VL).

6. The imaging apparatus as in claim 1, wherein each individual light source of said light source configuration is selected from the group including LED, halogen light sources and fluorescence image.

7. The imaging apparatus as in claim 1, wherein said processor is in communication flow with a remote processing unit.

8. The imaging apparatus as in claim 7, wherein said remote processing unit is a remote server.

9. The imaging apparatus as in claim 7, wherein said remote processing unit is a mobile device.

10. A method for imaging a document having an imaged side and a back side, the method comprising the steps of:
(a) providing an imaging apparatus, facilitated to operate in an open environment or a closed environment, including:
    i. a processor;
    ii. memory coupled to operate with said processor;
    iii. an imaging device including:
        A) at least one image sensor; and
        B) an light-source-configuration, including at least one cluster of light sources facilitated to directly illuminate the document from at least two illuminating angles;
    iv. a bench having an upper surface; and
    v. a document holding mechanism including at least one paperweight,
(b) placing the document on said upper surface of said bench, wherein said image side of the document faces said image sensor;
(c) determining the type of the document, the type selected from the group consisting of a booklet-type document, a large form document and a small form document;
(d) pushing the document underneath said at least one paperweight, when said document is a booklet-type document or a large form document, to thereby move said at least one paperweight upwards inside said respective fitted hollow space, and wherein said at least one paperweight then flattens the document by the force of gravity; and
(e) activating said imaging apparatus, wherein said cluster of light sources are operated alternately, in a preconfigured sequence, to directly illuminating the portions of the document being imaged, and wherein each of said at least one image sensors are preconfigured to acquire an image frame of said portions of the document being imaged, in operative synchronization with the activation of the respective cluster of light sources.

\* \* \* \* \*